(12) United States Patent
Schulter et al.

(10) Patent No.: US 10,497,143 B2
(45) Date of Patent: *Dec. 3, 2019

(54) ADVANCED DRIVER-ASSISTANCE SYSTEM USING ACCURATE OBJECT PROPOSALS BY TRACKING DETECTIONS

(71) Applicant: NEC Laboratories America, Inc., Princeton, NJ (US)

(72) Inventors: Samuel Schulter, Santa Clara, CA (US); Wongun Choi, Lexington, MA (US); Bharat Singh, Hyattsville, MD (US); Manmohan Chandraker, Santa Clara, CA (US)

(73) Assignee: NEC Corporation (JP)

( * ) Notice: Subject to any disclaimer, the term of this patent is extended or adjusted under 35 U.S.C. 154(b) by 78 days.

This patent is subject to a terminal disclaimer.

(21) Appl. No.: 15/711,288

(22) Filed: Sep. 21, 2017

(65) Prior Publication Data

US 2018/0134288 A1    May 17, 2018

Related U.S. Application Data

(60) Provisional application No. 62/421,441, filed on Nov. 14, 2016.

(51) Int. Cl.
*G06K 9/00* (2006.01)
*G06T 7/73* (2017.01)
(Continued)

(52) U.S. Cl.
CPC .............. *G06T 7/74* (2017.01); *B60W 30/09* (2013.01); *B60W 30/0956* (2013.01);
(Continued)

(58) Field of Classification Search
CPC .................. G06T 2207/10016; G06K 9/00791
See application file for complete search history.

(56) References Cited

U.S. PATENT DOCUMENTS

2013/0177201 A1    7/2013    Koo et al.
2014/0320664 A1    10/2014    Hyun
(Continued)

OTHER PUBLICATIONS

Kang, et al., "Object Detection from Video Tubelets with Convolutional Neural Networks", The IEEE Conference on Computer Vision and Pattern Recognition (CVPR), Jun. 2016, pp. 818-825.
(Continued)

*Primary Examiner* — Oneal R Mistry
(74) *Attorney, Agent, or Firm* — Joseph Kolodka

(57) ABSTRACT

A system and method are provided for driving assistance. The system includes an image capture device configured to capture a video sequence, relative to an outward view from a vehicle, which includes a set of objects and is formed from a set of image frames. The system includes a processor configured to detect the objects to form a set of object detections, and track the set of object detections over the frames to form tracked detections. The processor is configured to generate for a current frame, responsive to conditions, a set of sparse object proposals for a current location of an object based on: (i) the tracked detections of the object from an immediately previous frame; and (ii) detection proposals for the object derived from the current frame. The processor is configured to perform an action to mitigate a likelihood of potential harmful due to a current object location.

19 Claims, 11 Drawing Sheets

(51) Int. Cl.
| | |
|---|---|
| G06T 7/20 | (2017.01) |
| B60W 30/09 | (2012.01) |
| B60W 30/095 | (2012.01) |
| G06T 7/292 | (2017.01) |
| G06T 7/246 | (2017.01) |
| G06F 3/0482 | (2013.01) |
| G08B 21/02 | (2006.01) |
| G06K 9/32 | (2006.01) |
| G06T 9/00 | (2006.01) |
| G06N 3/02 | (2006.01) |

(52) U.S. Cl.
CPC ....... *G06F 3/0482* (2013.01); *G06K 9/00744* (2013.01); *G06K 9/00771* (2013.01); *G06K 9/00785* (2013.01); *G06K 9/00791* (2013.01); *G06K 9/00805* (2013.01); *G06K 9/3241* (2013.01); *G06T 7/20* (2013.01); *G06T 7/246* (2017.01); *G06T 7/292* (2017.01); *G06T 9/002* (2013.01); *G08B 21/02* (2013.01); *G06N 3/02* (2013.01); *G06T 2200/28* (2013.01); *G06T 2207/10016* (2013.01); *G06T 2207/20084* (2013.01); *G06T 2207/30232* (2013.01); *G06T 2210/12* (2013.01)

(56) References Cited

U.S. PATENT DOCUMENTS

| | | | |
|---|---|---|---|
| 2015/0248586 A1 | 9/2015 | Gaidon et al. | |
| 2016/0103213 A1 | 4/2016 | Ikram et al. | |
| 2016/0343146 A1* | 11/2016 | Brown | G06K 9/481 |
| 2017/0053167 A1* | 2/2017 | Ren | G06K 9/00624 |
| 2017/0180723 A1* | 6/2017 | Chanussot | G06K 9/00791 |
| 2017/0286774 A1* | 10/2017 | Gaidon | G06K 9/00718 |
| 2018/0170369 A1* | 6/2018 | Mitchell | B62D 15/029 |

OTHER PUBLICATIONS

Oneata, et al., "Spatio-Temporal Object Detection Proposals", HAL, Jan. 2014, 17 pages.

Thomas Brox et al., "Object Segmentation by Long Term Analysis of Point Trajectories", European Conference on Computer Vision (ECCV), 2010, pp. 282-295, See p. 285, lines 36-45; and figure 3.

* cited by examiner

ADVANCED DRIVER-ASSISTANCE SYSTEM USING ACCURATE OBJECT PROPOSALS BY TRACKING DETECTIONS

RELATED APPLICATION INFORMATION

This application claims priority to provisional application Ser. No. 62/421,441 filed on Nov. 14, 2016, incorporated herein by reference. This application is related to an application entitled "Accurate Object Proposals By Tracking Detections", having application No. 15/711,214, and which is incorporated by reference herein in its entirety. This application is related to an application entitled "Surveillance System Using Accurate Object Proposals By Tracking Detections", having application No. 15/711,349, and which is incorporated by reference herein in its entirety. This application is related to an application entitled "Action Recognition System Using Accurate Object Proposals By Tracking Detections", having application No. 15/711,373, and which is incorporated by reference herein in its entirety.

BACKGROUND

Technical Field

The present invention relates to object tracking, and more particularly to an Advanced Driver-Assistance System using accurate object proposals by tracking detections.

Description of the Related Art

Many practical applications require reliable object detection in every frame of a video sequence, e.g., activity recognition, surveillance or autonomous driving. Modern object detectors rely on strong but computationally heavy image representations that require category independent object proposal mechanisms to reduce the search space. While video data imposes strong priors on object motion, many object detectors ignore this information and are applied in every frame independently.

Thus, there is a need for an improved approach to object detection.

SUMMARY

According to an aspect of the present invention, a system is provided for driving assistance. The system includes an image capture device configured to capture a video sequence relative to an outward view from a motor vehicle and formed from a set of input image frames. The video sequence includes a set of objects. The system further includes a processor. The processor is configured to detect the objects to form a set of object detections. The processor is further configured to track the set of object detections over one or more of the input frames to form tracked detections over the one or more input frames. The processor is also configured to generate for a current input frame, responsive to a set of conditions, a set of sparse object proposals for a current location of one or more of the objects in the set based on: (i) the tracked detections of the one or more of the objects from an immediately previous one of the input frames; and (ii) detection proposals for the one or more objects derived from the current frame. The processor is additionally configured to perform an action to mitigate a likelihood of potential harmful due to a current location of the one or more of the objects relative to the motor vehicle, based on the set of sparse object proposals.

According to another aspect of the present invention, a computer-implemented method is provided for driving assistance. The method includes capturing, by an image capture device, a video sequence relative to an outward view from a motor vehicle and formed from a set of input image frames. The video sequence includes a set of objects. The method further includes detecting, by a processor, the objects to form a set of object detections. The method also includes tracking, by the processor, the set of object detections over one or more of the input frames to form tracked detections over the one or more input frames. The method additionally includes generating, by the processor, for a current input frame, responsive to a set of conditions, a set of sparse object proposals for a current location of one or more of the objects in the set based on: (i) the tracked detections of the one or more of the objects from an immediately previous one of the input frames; and (ii) detection proposals for the one or more objects derived from the current frame. The method also includes performing, by the processor, an action to mitigate a likelihood of potential harmful due to a current location of the one or more of the objects relative to the motor vehicle, based on the set of sparse object proposals.

According to yet another aspect of the present invention, a computer program product is provided for driving assistance. The computer program product includes a non-transitory computer readable storage medium having program instructions embodied therewith. The program instructions are executable by a computer to cause the computer to perform a method. The method includes capturing, by an image capture device, a video sequence relative to an outward view from a motor vehicle and formed from a set of input image frames. The video sequence includes a set of objects. The method also includes detecting, by a processor, the objects to form a set of object detections. The method further includes tracking, by the processor, the set of object detections over one or more of the input frames to form tracked detections over the one or more input frames. The method additionally includes generating, by the processor, for a current input frame, responsive to a set of conditions, a set of sparse object proposals for a current location of one or more of the objects in the set based on: (i) the tracked detections of the one or more of the objects from an immediately previous one of the input frames; and (ii) detection proposals for the one or more objects derived from the current frame. The method also includes performing, by the processor, an action to mitigate a likelihood of potential harmful due to a current location of the one or more of the objects relative to the motor vehicle, based on the set of sparse object proposals.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to an Advanced Driver-Assistance System using accurate object proposals by tracking detections.

In an embodiment, an Advanced Driver-Assistance System using a video-based object proposal method is provided that exploits the predictions from the object detector in the previous frame. The method combines image-based proposals from the current frame and bounding boxes from the strong object detector tracked from previous frames. Tracked detections are well localized and already classified, which provides a strong prior for proposals in the current frame. The method is generic in a sense that it can be combined with any image-based proposal method and any object detector relying on object proposals.

The method achieves higher recall and better localization than proposals generated from the current frame alone. Moreover, due to the strong prior from previous frames, the approach of the present invention works also well with a low number of proposals.

It is to be appreciated that object detection in accordance with the present invention can be applied to applications including, but not limited to, any of the following: driving (autonomous driving, Advanced Driver-Assistance Systems (ADAS), etc.), surveillance; action recognition; video analysis; and so forth. Of course, the present invention can also be applied to a myriad of other applications, as readily appreciated by one of ordinary skill in the art given the teachings of the present invention provided herein, while maintaining the spirit of the present invention.

The proposals generated by the present invention are considered sparse in that they can be generated only under certain conditions. For example, the proposals can be generated only when objects are not already covered by (existing) tracked detections. In this way, the generation of proposals is limited to only situations where they provide the most benefit.

Figure 1:
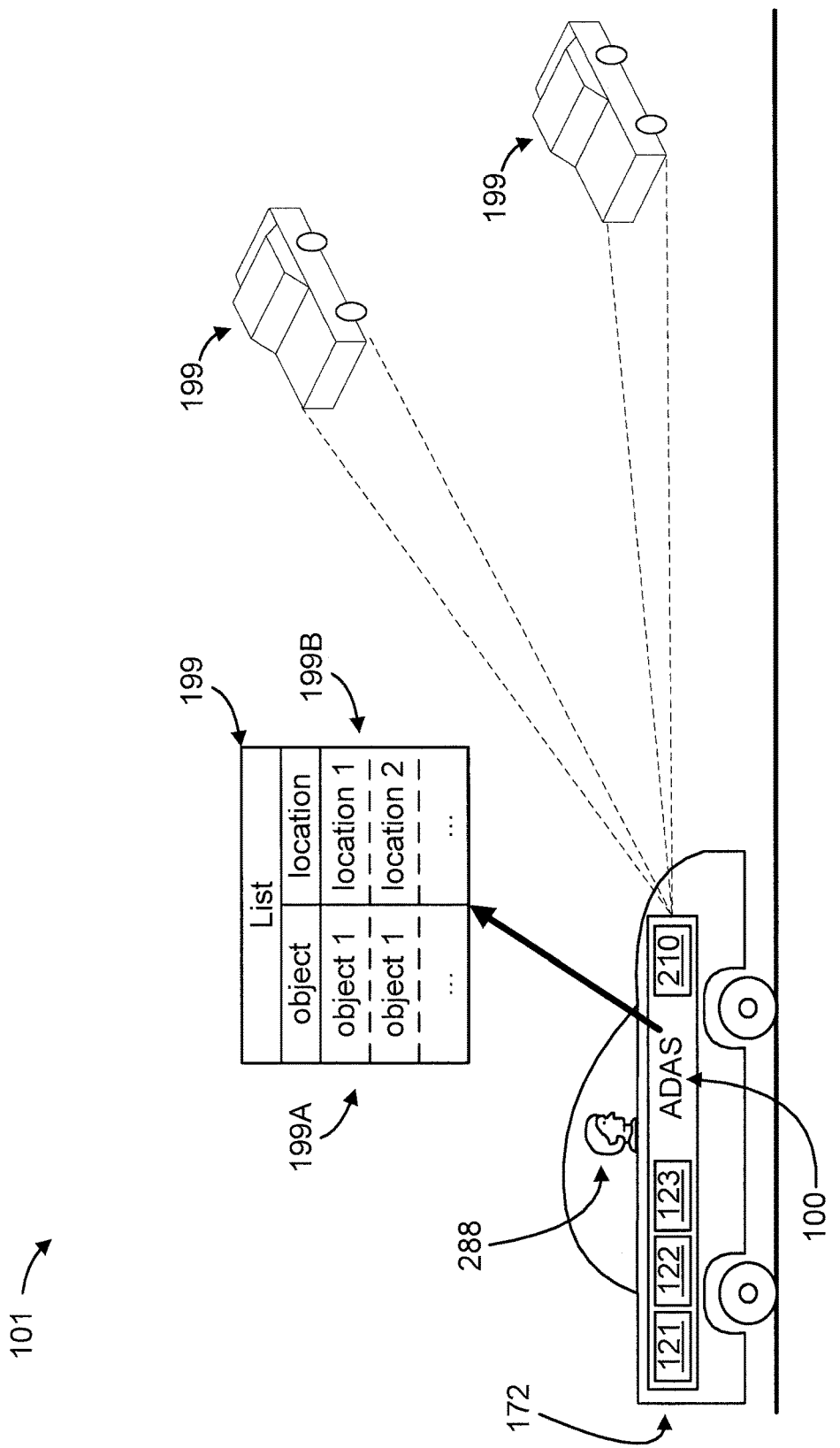
FIG. 1 shows an exemplary Advanced Driver-Assistance System (ADAS) based on tracking object detections, in accordance with an embodiment of the present invention.

FIG. 1 shows an exemplary Advanced Driver-Assistance System (ADAS) 100 based on tracking object detections, in accordance with an embodiment of the present invention.

The ADAS 100 is used in an environment 101 wherein a user 188 is located in a scene with multiple objects 199, each having their own locations and trajectories. The user 188 is operating a vehicle 172 (e.g., a car, a truck, a motorcycle, etc.).

The ADAS 100 includes a camera system 110. While a single camera system 110 is shown in FIG. 1 for the sakes of illustration and brevity, it is to be appreciated that multiple camera systems can be also used, while maintaining the spirit of the present invention. The ADAS 100 further includes a server 120 configured to perform object detection in accordance with the present invention. The server 120 can include a processor 121, a memory 122, and a wireless transceiver 123. The processor 121 and the memory 122 of the remote server 120 can be configured to perform driver assistance functions based on images received from the camera system 110 by the (the wireless transceiver 123 of) the remote server 120. In this way, a list 199 of detected objects 199A and their locations 199B can be provided to the user 188 and/or the vehicle 172 in order for corrective action to be taken by the user 188 and/or the vehicle 172. Such application uses can involve one or more actions performed responsive to the list, as readily appreciated by one of ordinary skill in the art.

The ADAS 100 can interface with the user through one or more systems of the vehicle 172 that the user is operating. For example, the ADAS 100 can provide the user information (e.g., detected objects 199, their locations 199B, suggested actions, etc.) through a system 172A (e.g., a display system, a speaker system, and/or some other system) of the vehicle 172. Moreover, the ADAS 100 can interface with the vehicle 172 itself (e.g., through one or more systems of the vehicle 172 including, but not limited to, a steering system, a braking system, an acceleration system, a steering system, etc.) in order to control the vehicle or cause the vehicle 172 to perform one or more actions. In this way, the user or the vehicle 172 itself can navigate around these objects 199 to avoid potential collisions there between.

Figure 2:
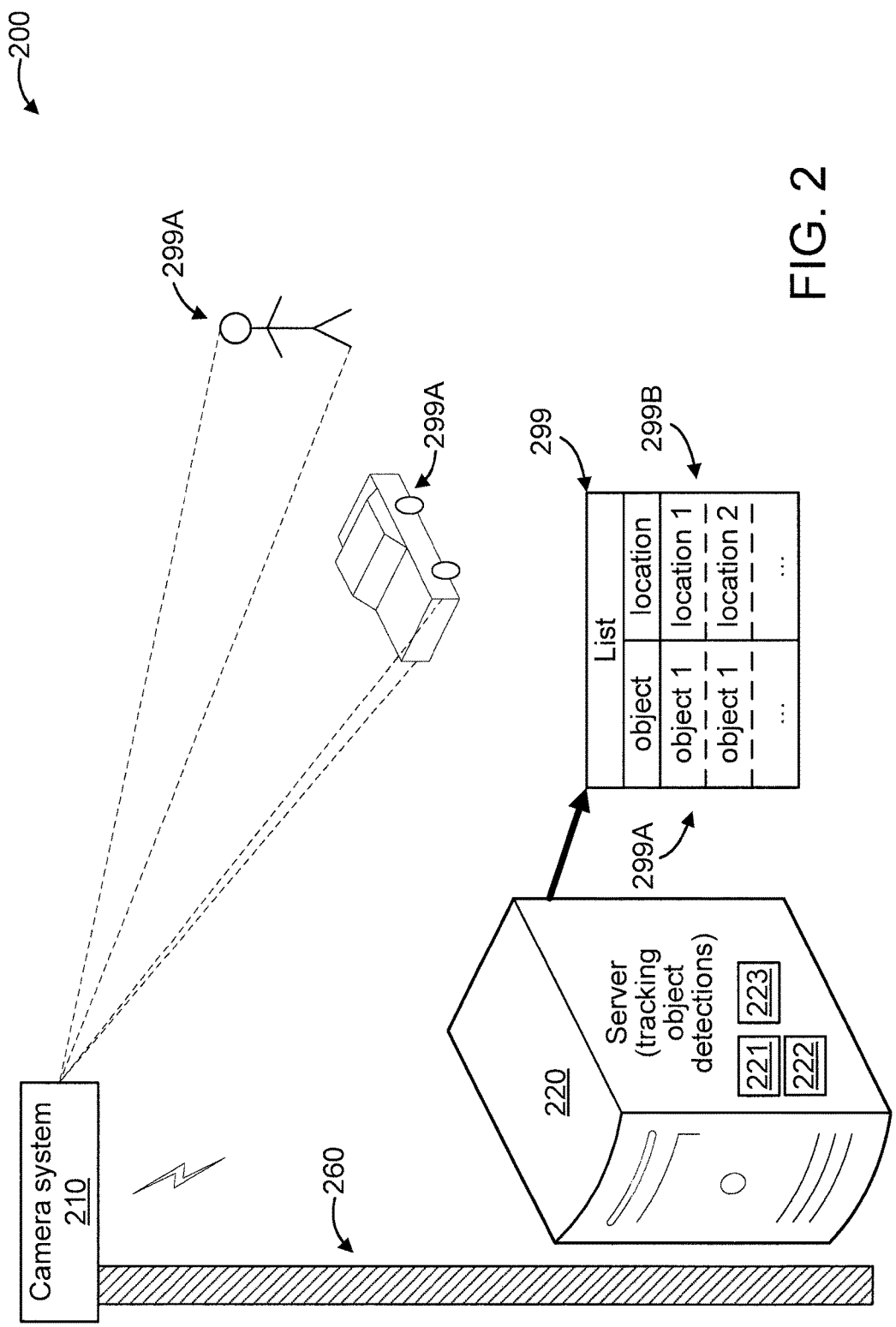
FIG. 2 shows an exemplary system for tracking object detections, in accordance with an embodiment of the present invention.

FIG. 2 shows an exemplary system 200 for tracking object detections, in accordance with an embodiment of the present invention.

The system 200 includes a camera system 210. While a single camera system 210 is shown in FIG. 2 for the sakes of illustration and brevity, it is to be appreciated that multiple camera systems can be also used, while maintaining the spirit of the present invention.

In the embodiment of FIG. 2, the camera system 210 is mounted on a mounting entity 260. For the sake of illustration, the mounting entity 260 is a pole. While a pole 260 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 210 can be mounted in or on any of the following: a building; a drone; a vehicle; and so forth. The preceding examples are merely illustrative.

The camera system 210 can be a wireless camera system having its own antenna(s) or can use one or more antennas included on the pole 260 (or other mounting entity (e.g., building, drone, vehicle, etc.) to which the camera system 210 is mounted or proximate).

The system 200 further includes a server 220 configured to perform object detection. The object detection can involve detecting the presence of multiple objects, identifying the locations of the multiple objects, identifying particular actions performed by the multiple objects, and/or performing one or more actions (e.g., in response to particular object detection results). The server 220 can located remote from, or proximate to, the camera system 210. The server 220 can include, e.g., a processor 221, a memory 222, and a wireless transceiver 223. The processor 221 and the memory 222 of the remove server 220 can be configured to perform object detection based on images received from the camera system 210 by the (the wireless transceiver 223 of) the remote server 220. In this way, a list 299 of detected objects 299A and their locations 299B can be provided for any of a myriad of possible application uses relating to object detection. Such application uses can involve one or more actions performed responsive to the list, as readily appreciated by one of ordinary skill in the art.

Accordingly, some exemplary suitable environments to which the present invention can be applied can include any environments where object detection can be used. For example, exemplary suitable environments include, but are not limited to, a driving environment, an environment to be surveilled, a sports or other event, a battle field, a riot scenario, a picketing scenario, video analysis, and so forth.

Figure 3:
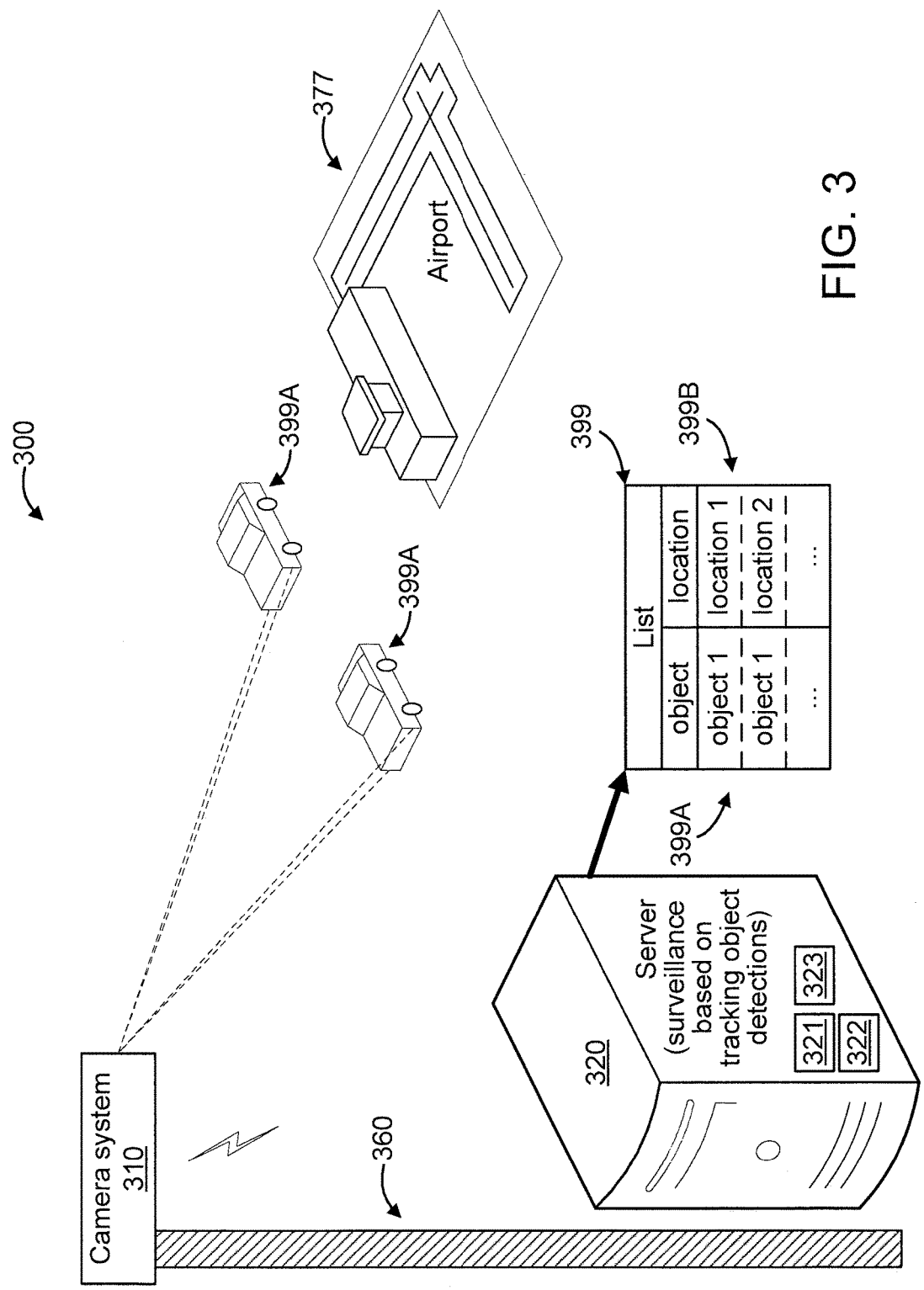
FIG. 3 shows an exemplary system for surveillance based on tracking object detections, in accordance with an embodiment of the present principles.

FIG. 3 shows an exemplary system 300 for surveillance based on tracking object detections, in accordance with an embodiment of the present principles.

The system 300 includes a camera system 310. While a single camera system 310 is shown in FIG. 3 for the sakes of illustration and brevity, it is to be appreciated that multiple camera systems can be also used, while maintaining the spirit of the present invention.

In the embodiment of FIG. 3, the camera system 310 is mounted on a mounting entity 360. For the sake of illustration, the mounting entity 360 is a pole. While a pole 360 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 310 can be mounted in or on any of the following: a building; and so forth. The preceding examples are merely illustrative.

The camera system 310 can be a wireless camera system having its own antenna(s) or can use one or more antennas included on the pole 360 (or other mounting entity (e.g., building, drone, etc.) to which the camera system 310 is mounted or proximate).

The system 300 further includes a server 320 configured to perform surveillance based on object detection. Such surveillance can be with respect to a secured object such as, for example, a secured facility 377. In the example of FIG. 3, the secured facility is an airport. Of course, other secured facilities can also be surveilled in accordance with the present invention. The surveillance can involve detecting the presence of objects, identifying the locations of the objects, identifying particular actions performed by the objects, and/or performing one or more actions in response to object detection/surveillance results (e.g., in response to particular object detection results). The server 320 can be located remote from, or proximate to, the camera system 310. The server 320 can include a processor 321, a memory 322, and a wireless transceiver 323. The processor 321 and the memory 322 of the remote server 320 can be configured to perform surveillance based on images received from the camera system 310 by the (the wireless transceiver 323 of) the remote server 320. In this way, a list 399 of detected objects 399A and their locations 399B can be provided for any of a myriad of possible surveillance application uses relating to object detection. Such application uses can involve one or more actions performed responsive to the list, as readily appreciated by one of ordinary skill in the art. For example, an alert (local and/or remote) can be provided, one or more doors and/or windows can be closed and locked to secure the person within a specific area or to keep the person from (out of) that specific area, a person containment procedure can be automatically performed, and so forth.

Accordingly, some exemplary suitable environments to which the present invention can be applied can include any environments where surveillance can prove useful such as mass transit hubs, border crossings, subways, transportation hubs, airports, ship ports, and so forth. It is to be appreciated that the preceding environments are merely illustrative and, thus, other environments can also be used, while maintaining the spirit of the present invention.

Figure 4:
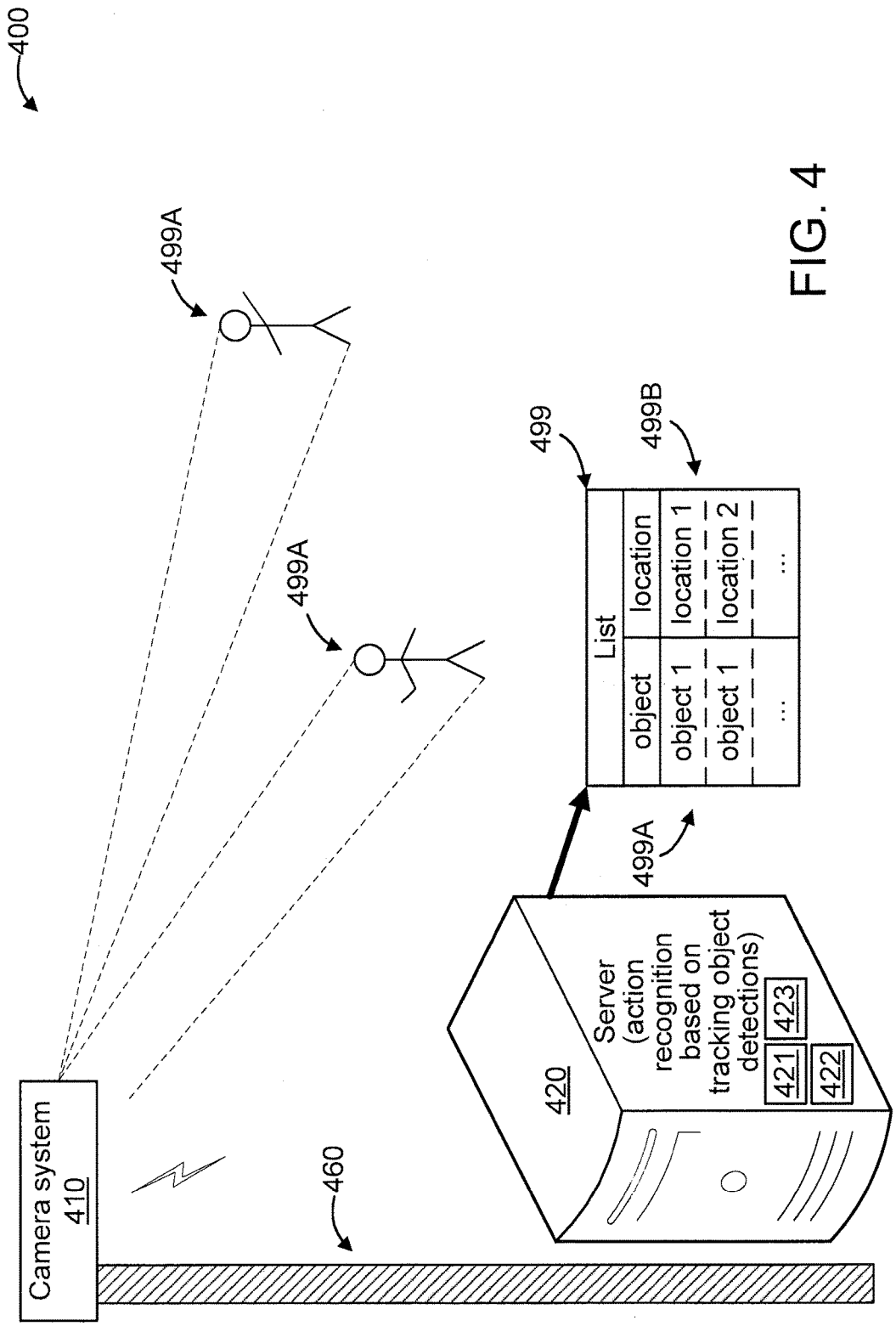
FIG. 4 shows an exemplary system for action recognition based on tracking object detections, in accordance with an embodiment of the present invention.

FIG. 4 shows an exemplary system 400 for action recognition based on tracking object detections, in accordance with an embodiment of the present invention.

The system 400 includes a camera system 410. While a single camera system 410 is shown in FIG. 4 for the sakes of illustration and brevity, it is to be appreciated that multiple camera systems can be also used, while maintaining the spirit of the present invention.

In the embodiment of FIG. 4, the camera system 410 is mounted on a mounting entity 460. For the sake of illustration, the mounting entity 460 is a pole. While a pole 460 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 410 can be mounted in or on any of the following: a building; and so forth. The preceding examples are merely illustrative.

The camera system 410 can be a wireless camera system having its own antenna(s) or can use one or more antennas included on the pole 460 (or other mounting entity (e.g., building, drone, etc.) to which the camera system 410 is mounted or proximate).

The system 400 further includes a server 420 configured to perform action recognition based on object detection. Such action recognition can be with respect to a secured object such as, for example, a facility 477. The facility can be a secured facility or a non-secured facility. In the example of FIG. 4, the facility is a secured facility implemented as an airport. Of course, other facilities (e.g., mass transit hub, sports complex, etc.) can also be monitored with respect to action recognition based on object detection in accordance with the present invention. The action recognition can involve detecting the presence of objects, identifying the locations of the objects, identifying particular actions performed by the objects and/or particular actions performed by one or more persons using the objects, and/or performing one or more actions in response to object detection/action recognition results (e.g., in response to particular object detection results). The server 420 can be located remote from, or proximate to, the camera system 410. The server 420 can include a processor 421, a memory 422, and a wireless transceiver 423. The processor 421 and the memory 422 of the remote server 420 can be configured to perform surveillance based on images received from the camera system 410 by the (the wireless transceiver 423 of) the remote server 420. In this way, a list 499 of detected objects 499A and their locations 499B can be provided for any of a myriad of possible surveillance application uses relating to object detection. Such application uses can involve one or more actions performed responsive to the list, as readily appreciated by one of ordinary skill in the art. For example, an alert (local and/or remote) can be provided, one or more doors and/or windows can be closed and locked to secure the person within a specific area or to keep the person from (out of) that specific area, a person containment procedure can be automatically performed, and so forth.

Accordingly, some exemplary suitable environments to which the present invention can be applied can include any environments where action recognition can prove useful such as mass transit hubs, border crossings, subways, transportation hubs, airports, ship ports, sports facilities, and so forth. It is to be appreciated that the preceding environments are merely illustrative and, thus, other environments can also be used, while maintaining the spirit of the present invention.

Any action type of interest can be recognized, depending upon the implementation. For example, the action may include, but is not limited to, one or more of the following: an intruder running up to a premises or an object; a projectile approaching the premises or the object; a sporting action; a prohibited action (e.g., holding a weapon in a place where weapons are prohibited except for, e.g., law enforcement, etc.); a potentially dangerous action; and so forth. It is to be appreciated that the preceding actions are merely illustrative.

Figure 5:
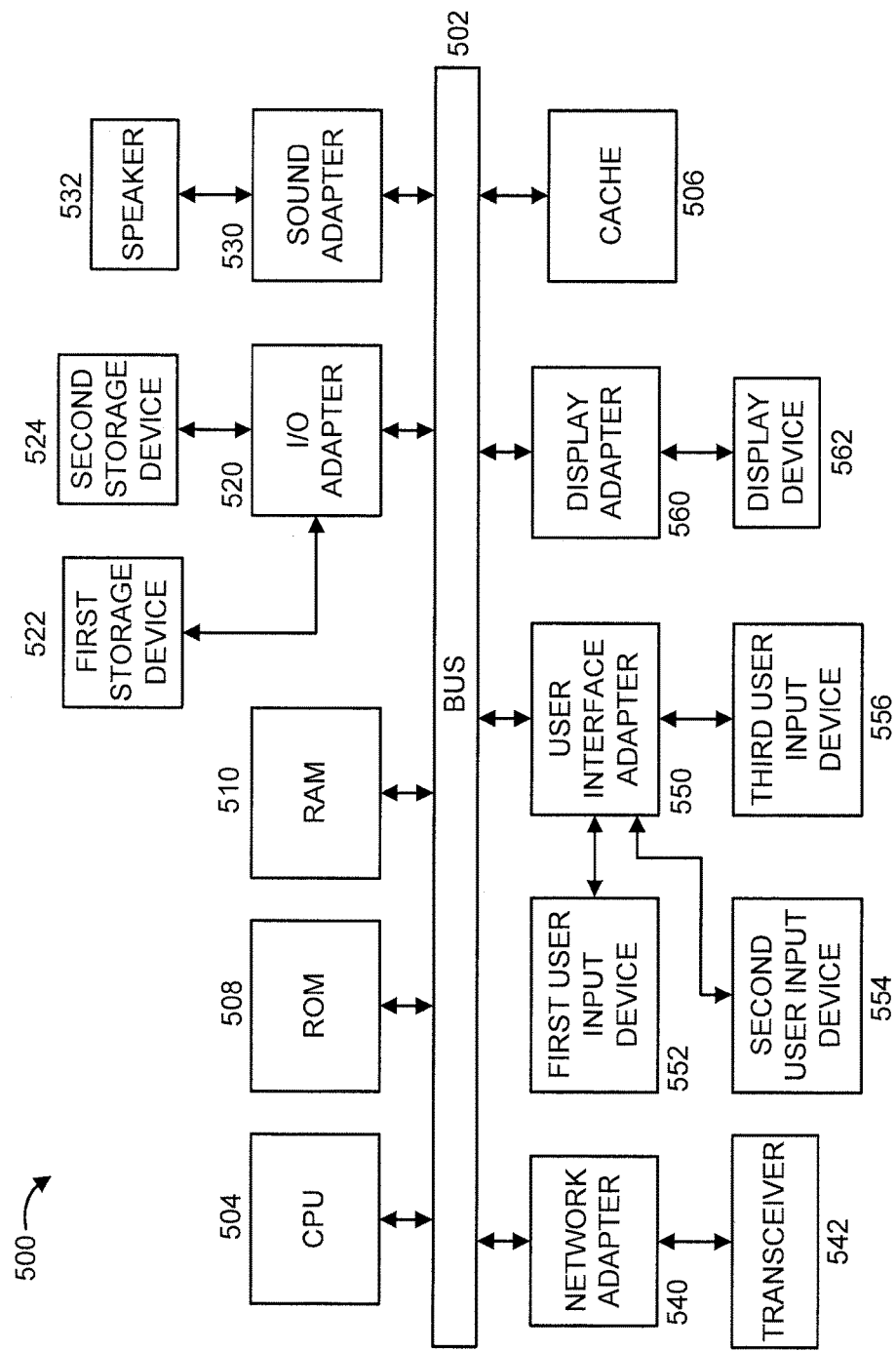
FIG. 5 shows an exemplary processing system to which the present principles may be applied, according to an embodiment of the present principles.

FIG. 5 shows an exemplary processing system 500 to which the present principles may be applied, according to an embodiment of the present principles. In an embodiment, the server 120 of FIG. 1 and/or the server 220 of FIG. 2 and/or the server 320 of FIG. 3 and/or the server 420 of FIG. 4 can be implemented, at least in part, by processing system 500.

The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Moreover, it is to be appreciated that systems 100, 200, 300, and 400 described above with respect to FIGS. 1, 2, 4, and 4, respectively, are systems for implementing respective embodiments of the present principles. Part or all of processing system 500 may be implemented in one or more of the elements of any of systems 100, 200, 300, and 400.

Further, it is to be appreciated that system 500 may perform at least part of the method described herein including, for example, at least part of method 600 of FIGS. 6-11. Similarly, part or all of any of systems 200, 300, 400, and/or 500 may be used to perform at least part of method 600 of FIGS. 6-11.

FIGS. 6-11 show an exemplary method 600 for tracking object detections, in accordance with an embodiment of the present principles.

Figure 6:
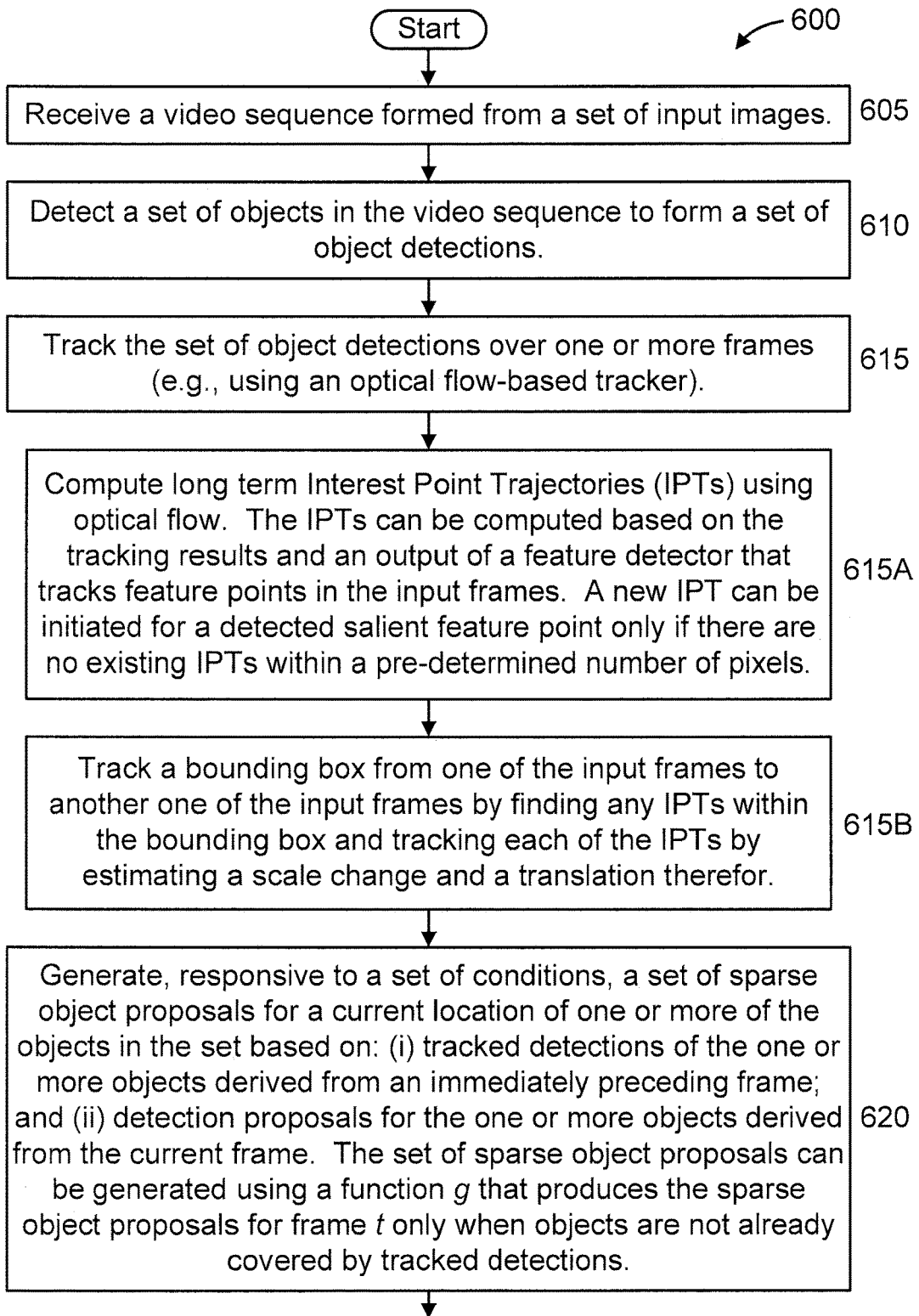
FIGS. 6-11 show an exemplary method for tracking object detections, in accordance with an embodiment of the present principles.

Referring to FIG. 6, at step 605, receive a video sequence formed from a set of input images.

At step 610, detect a set of objects in the video sequence to form a set of object detections.

At step 615, track the set of object detections over one or more frames (hereinafter "preceding frames" or "previous frames"). For example, the set of object detections can be tracked using an optical flow-based tracker. Of course, other types of trackers can also be used, while maintaining the spirit of the present invention.

In an embodiment, step 615 can include one or more of steps 615A and step 615B.

At step 615A, compute long term Interest Point Trajectories (IPTs) using optical flow. In an embodiment, the IPTs can be computed based on the tracking results (e.g., from an optical flow-based or other type of tracker) and an output of a feature detector that tracks feature points in the input frames. In an embodiment, a new IPT can be initiated for a detected salient feature point only if there are no existing IPTs within a pre-determined number of pixels (e.g., four pixels, namely the adjacent pixels).

At step 615B, track a bounding box from one of the input frames to another one of the input frames by finding any IPTs within the bounding box and tracking each of the IPTs by estimating a scale change and a translation therefor.

At step 620, generate, responsive to a set of conditions, a set of sparse object proposals for a current location of one or more of the objects in the set based on: (i) tracked detections of the one or more objects derived from an immediately preceding frame (e.g., the immediately preceding frame at time t−1, when the current frame corresponds to time t); and (ii) detection proposals for the one or more objects derived from the current frame. In an embodiment, the set of sparse object proposals can be generated using a function g that produces the sparse object proposals for frame t only when objects are not already covered by tracked detections. In an embodiment, the function can be formulated as a binary classification problem. In an embodiment, the function can be implemented by a neural network.

In an embodiment relating to step 620, the tracked detections can include a set of n tracked detections $\mathcal{T}^{t-1} = \{\mathcal{T}_1; \ldots; \mathcal{T}_n\}$ from the previous frame, and the detection proposals (ii) for the one or more objects derived from the current frame can include a set of m proposals $P_t = \{P_1; \ldots; P_m\}$ from the current frame, such that the function is implemented by $g(P_t, \mathcal{T}^{t-1})$.

In an embodiment relating to step 620, the set of conditions can include one or more (preferably all) of the following: (a) a new object appears; (b) the tracker fails to track the object resulting in poorly localized detection; (c) the detector already failed in the previous frames. Hence, in an embodiment, no proposals are generated if the tracker is successful.

In an embodiment, step 620 can include steps 620A and 620B.

Figure 7:
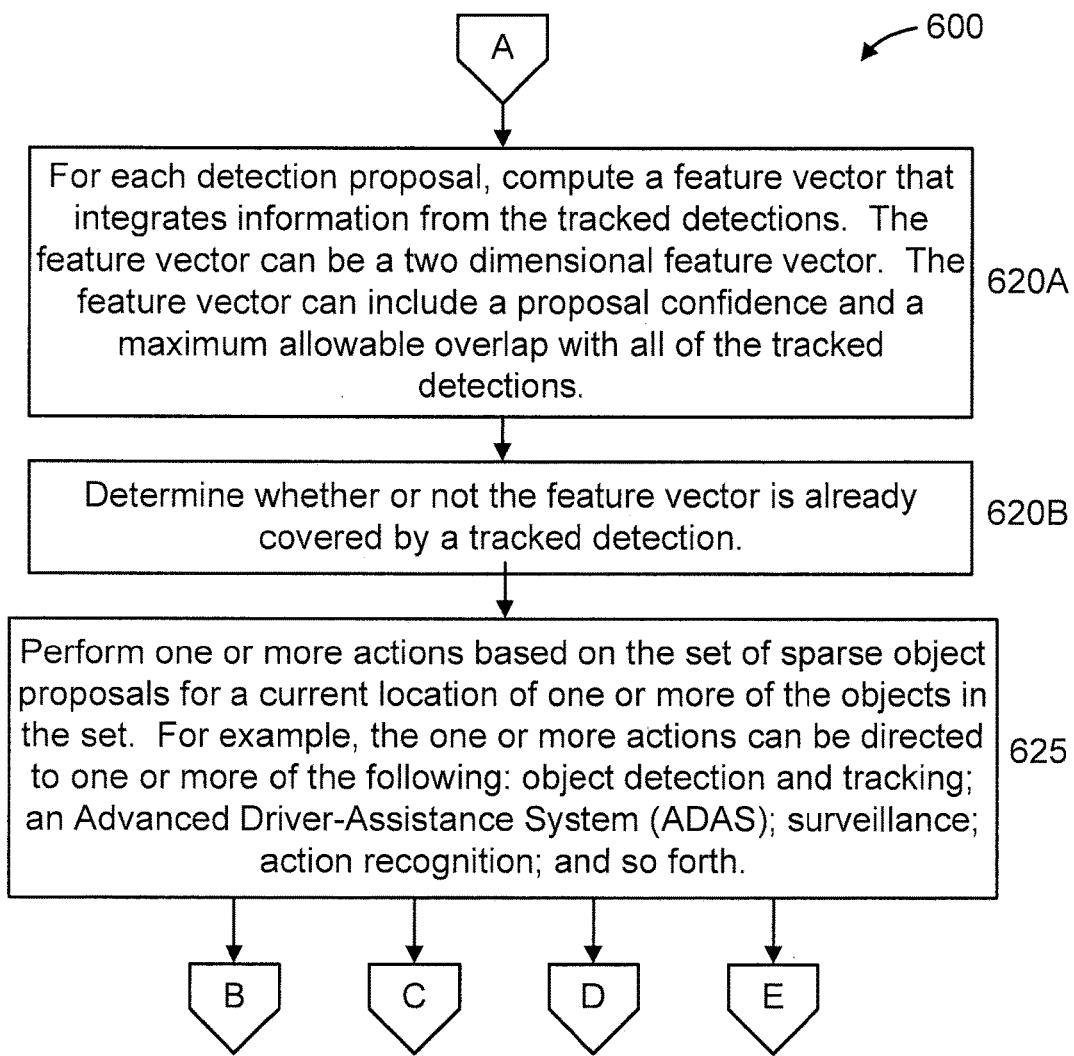

Referring to FIG. 7, at step 620A, for each detection proposal, compute a feature vector that integrates information from the tracked detections. In an embodiment, the feature vector can be a two dimensional feature vector. In an embodiment, the feature vector can include a proposal confidence and a maximum allowable overlap with all of the tracked detections.

At step 620B, determine whether or not the feature vector is already covered by a tracked detection.

At step 625, perform one or more actions based on the set of sparse object proposals for a current location of one or more of the objects in the set. For example, the one or more actions can be directed to one or more of the following: object detection and tracking; an Advanced Driver-Assistance System (ADAS); surveillance; action recognition; and so forth.

In an embodiment, step 625 can include one or more of steps 625A through 625C.

Figure 8:
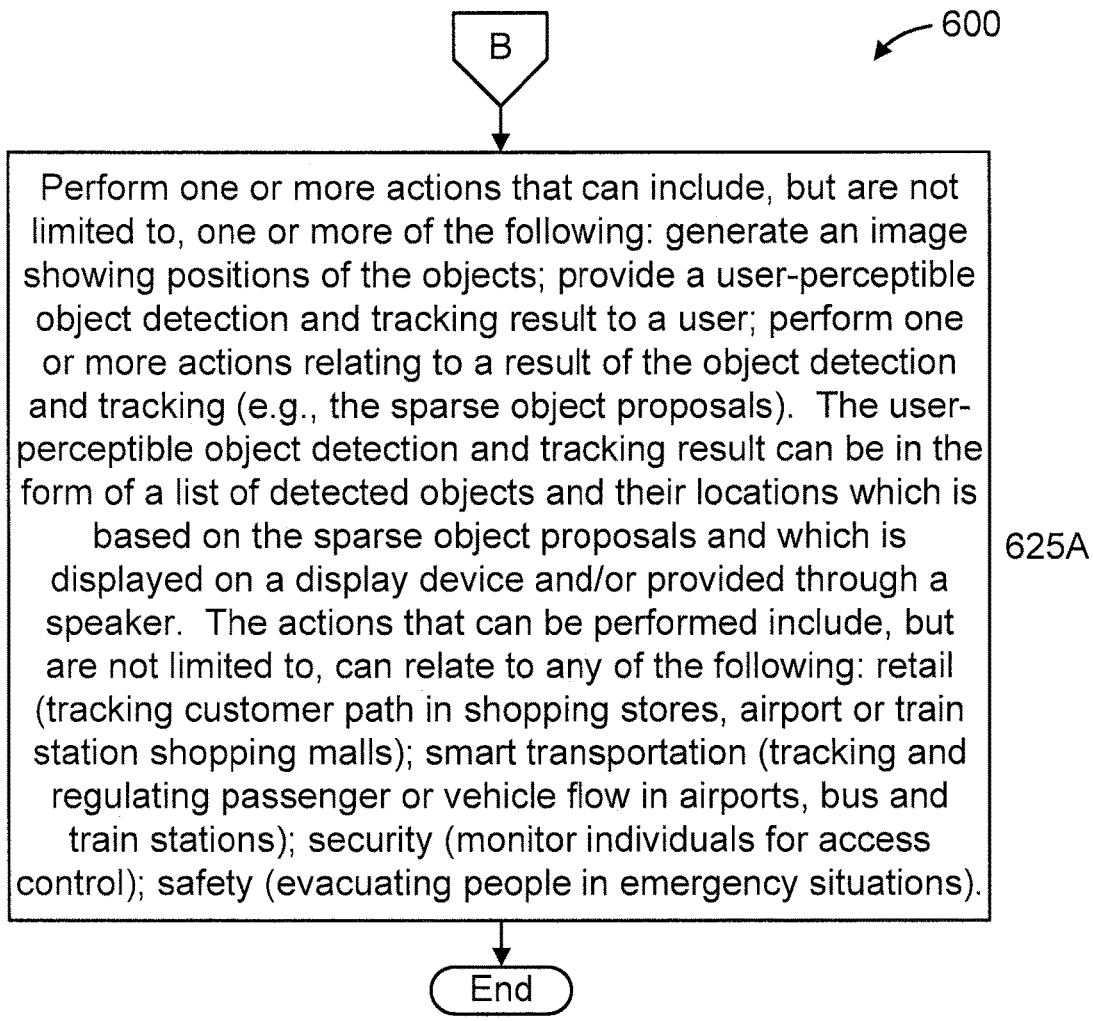

Referring to FIG. 8, at step 625A, corresponding to object detection and tracking, perform one or more actions that can include, but are not limited to, one or more of the following: generate an image showing positions of the objects; provide a user-perceptible object detection and tracking result to a user; perform one or more actions relating to a result of the object detection and tracking (e.g., the sparse object proposals). In an embodiment, the user-perceptible object detection and tracking result can be in the form of a list of detected objects and their locations which is based on the sparse object proposals and which is displayed on a display device and/or provided through a speaker. The actions that can be performed include, but are not limited to, can relate to any of the following: retail (tracking customer path in shopping stores, airport or train station shopping malls); smart transportation (tracking and regulating passenger or vehicle flow in airports, bus and train stations); security (monitor individuals for access control); safety (evacuating people in emergency situations). Other actions relating to an Advanced Driver-Assistance System (ADAS), a surveillance system, and an action recognition system are also described herein below.

Figure 9:
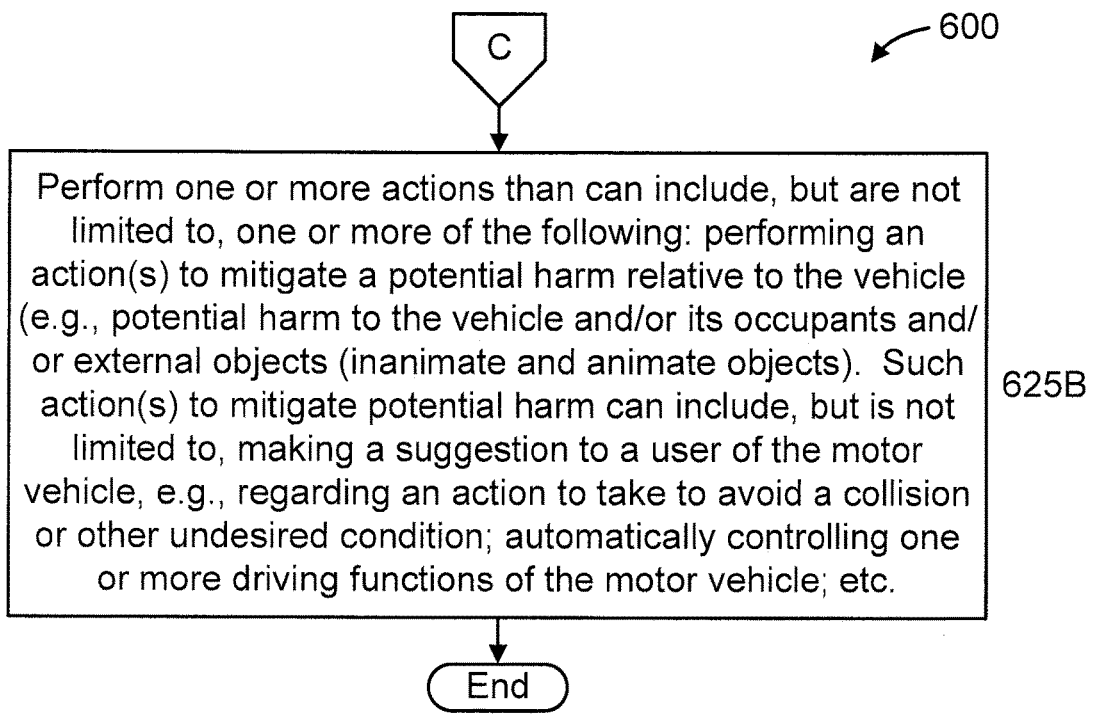

Referring to FIG. 9, at step 625B, corresponding to an Advanced Driver-Assistance System (ADAS), perform one or more actions than can include, but are not limited to, one or more of the following: performing an action(s) to mitigate a potential harm relative to the vehicle (e.g., potential harm to the vehicle and/or its occupants and/or external objects (inanimate and animate objects). Such action(s) to mitigate potential harm can include, but is not limited to, making a suggestion to a user of the motor vehicle, e.g., regarding an action to take to avoid a collision or other undesired condition; automatically controlling one or more driving functions of the motor vehicle; etc.

For example, automatically control one or more driving functions responsive to the detection results. For example, in an embodiment, the present invention is integrated with and/or otherwise coupled to an Advanced Driver-Assistance System (ADAS). The ADAS could apply a decision making process to, e.g., a list of object positions determined by step 625A, in order to determine whether a dangerous condition (s) exists or not (with respect to the motor vehicle) and to further determine a proper corrective action to take to avoid or at least mitigate any potential harm that can result from the dangerous condition. The decision making process can be any known type of decision making process including, but not limited to, preprogrammed rules, a neural network, a decision tree, and so forth. It is to be appreciated that the preceding decision making processes are merely illustrative and, thus, other decision making processes can also be used in accordance with the teachings of the present invention, while maintaining the spirit of the present invention.

The control that can be imposed by step 625B can involve, for example, but is not limited to, steering, braking, and accelerating functions. For example, responsive the location of a detected object directly in the path of the motor vehicle, the processor may initiate a control signal to the braking system to apply the brakes in order to avoid hitting the object with the motor vehicle. In another embodiment, when safe, the vehicle can be automatically steered by the processor initiating a control signal to the steering system. These and other implementations are readily determined by one of ordinary skill in the art, given the teachings of the present invention provided herein, while maintaining the spirit of the present invention.

Regarding the recommendations to the vehicle operator (e.g., brake now, brake hard, steer right, accelerate, etc.), these recommendations can be made visually and/or audibly. Hence, as can be envisioned by one of ordinary skill in the art, such recommendation can be directed to avoiding objects in a path of the motor vehicle (such as, e.g., an emergency vehicle or a non-emergency vehicle), where such objects can be inanimate or animate objects.

Figure 10:
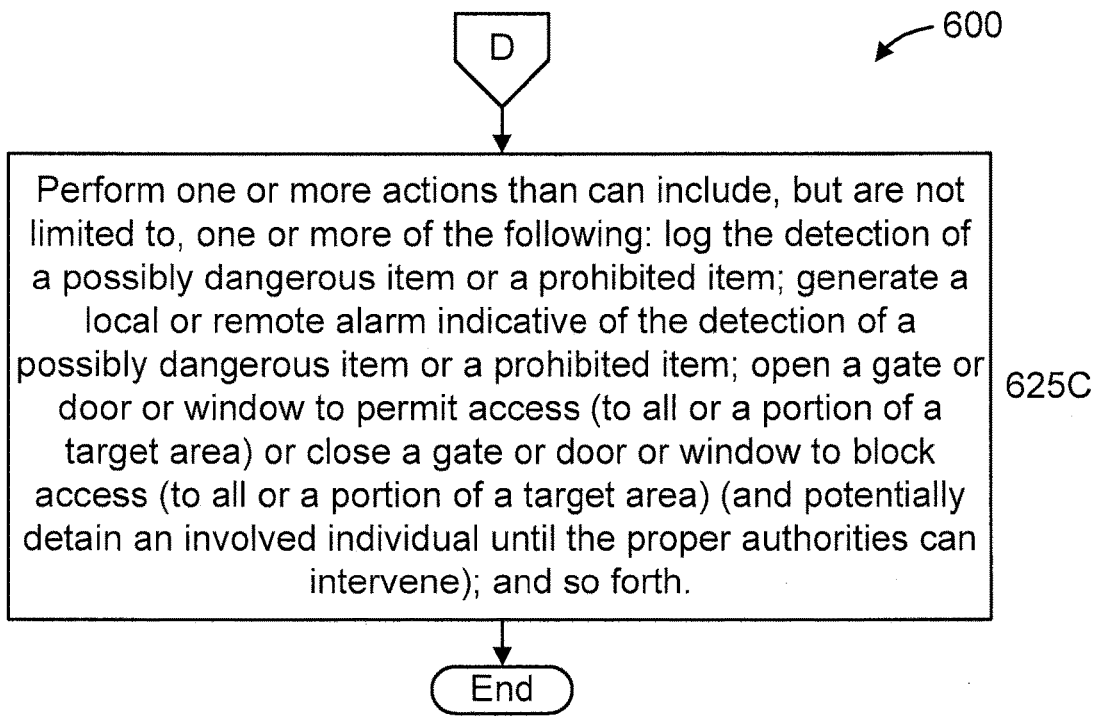

Referring to FIG. 10, at step 625C, corresponding to surveillance, perform one or more actions than can include, but are not limited to, one or more of the following: log the detection of a possibly dangerous item or a prohibited item; generate a local or remote alarm indicative of the detection of a possibly dangerous item or a prohibited item; open a gate or door or window to permit access (to all or a portion of a target area) or close a gate or door or window to block access (to all or a portion of a target area) (and potentially detain an involved individual until the proper authorities can intervene); and so forth.

Figure 11:
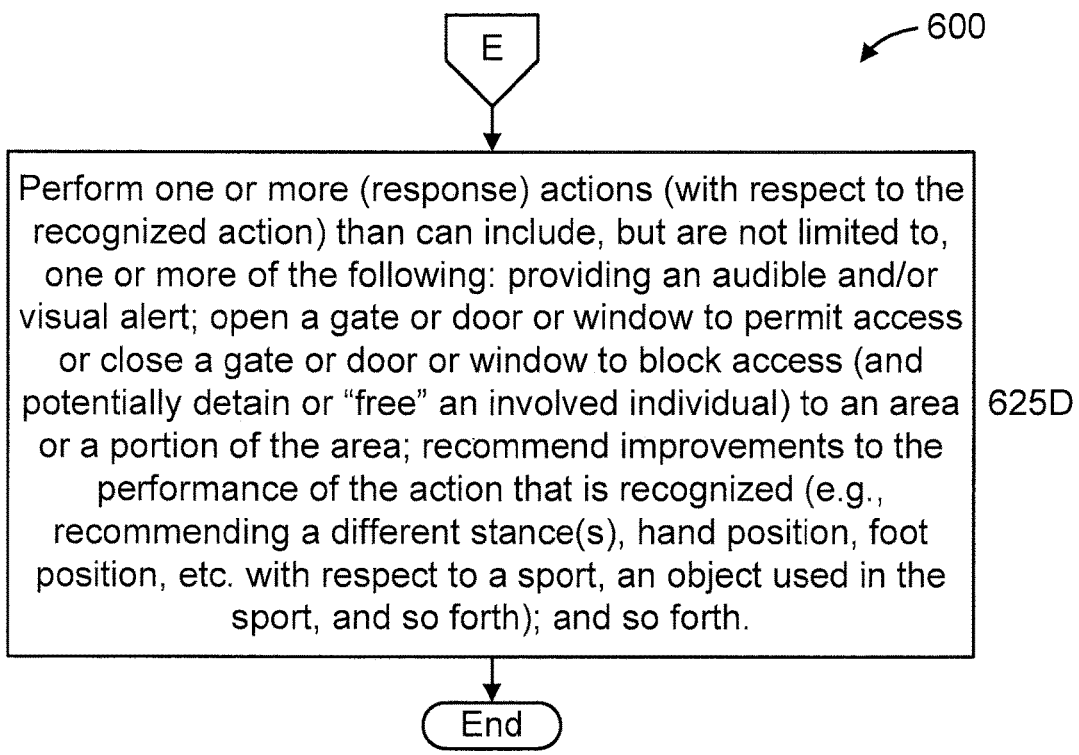

Referring to FIG. 11, at step 625D, corresponding to action recognition, perform one or more (response) actions (with respect to the recognized action) than can include, but are not limited to, one or more of the following: providing an audible and/or visual alert; open a gate or door or window to permit access or close a gate or door or window to block access (and potentially detain or "free" an involved individual) to an area or a portion of the area; recommend improvements to the performance of the action that is recognized (e.g., recommending a different stance(s), hand position, foot position, etc. with respect to a sport, an object used in the sport, and so forth); and so forth.

The system could apply a decision making process to, e.g., a list of object positions determined by step 625A, in order to determine what type of action is being performed (in order to recognize the action) and what type of response action should be performed in response to the detected action type, based on the sparse object proposals. The decision making process can be any known type of decision making process including, but not limited to, preprogrammed rules, a neural network, a decision tree, and so forth. It is to be appreciated that the preceding decision making processes are merely illustrative and, thus, other decision making processes can also be used in accordance with the teachings of the present invention, while maintaining the spirit of the present invention. Hence, the system could determine a person is performing a dangerous action (e.g., waiving a weapon (e.g., a knife, a firearm, etc.) and then secure the person within a target area or a region within a target area. The system could provide a user perceptible recommendation for a corrective action to the action performed by one or more users in order to optimize a performance of an action performed by the one or more users. The action can be a sports or any other type of action.

Regarding step 625 and its "sub-steps", the preceding actions mentioned with respect thereto are merely illustrative and, thus, other actions can also be performed in response to object detection and tracking results. As is evident to one of ordinary skill in the art, the action(s) taken is(are) dependent upon the type of application to which the present invention is applied.

A description will now be given regarding various aspects of the present invention.

Modern object detectors rely on strong but computationally heavy image representations that require category independent object proposal mechanisms to reduce the search space. While many practical applications demand object detection in streaming data, the temporal correlation in the appearance and location of objects across frames is often ignored. In an embodiment, the present invention provides an approach to exploit video information by combining image-based proposals from the current frame and tracked bounding boxes from previous frames. In an embodiment, the framework of the present invention learns the ability to propose new candidates only when needed, that is, when a new object appears or when the tracker fails. The immediate benefit is a reduction in the number of object proposals that need to be evaluated by the detector. The approach of the present invention is generic in the sense that it can be combined with any image-based proposal method and any detector relying on object proposals.

In an embodiment, a new detection framework is provided for videos, namely Sparse Video Proposals (SVP), which tightly interweaves proposal generation, detection and tracking. We exploit the fact that objects move smoothly through space and time, thus, simple methods suffice to track them over several frames. In particular, a novel object proposal module is described herein that takes a set of tracked detections from previous frames and the set of object proposals from the current frame. In contrast to standard proposal methods, the module generates bounding boxes only for objects that are not already covered by a detection. That is, the proposal mechanism will only generate proposals for newly appearing objects or for objects where the tracker fails. This enables a very effective detection pipeline with a fixed budget on the number of proposals that are evaluated by the detector per frame. The module is generic and can be used together with any proposal method and detector.

SVP can effectively exploit the temporal structure of videos to reduce the number of proposals for any modern object detector while keeping recall and accuracy high. SVP can successfully learn to generate proposals only when a new object appears in the scene or when the tracker drifts away from an object.

Indeed, proposal generation that respects temporal consistency is a problem of intrinsic interest and in contrast to previous works, our insight is that per-image proposal generation and tracking work well enough to derive those advantages at minimal overhead. In particular, we achieve this through design decisions such as a simple architecture for encoding temporally-aware proposal generation, a fast tracker that is arguably always available in video applications and using strictly less number of proposals than per-image methods. Thus, SVP obtains temporal consistency, at minimal overhead, with speed advantages depending on architecture choice, by learning precise conditions in videos where a new proposal is needed.

Some of the many key contributions made by the present invention include, but are not limited to, the following:

(1) A unified framework for harnessing temporal cues in video-based object detection, by incorporating tracked bounding boxes for proposal generation.

(2) An efficient mechanism that learns to generate proposals only when required—that is, when new objects appear or the tracked bounding box drifts.

(3) A novel detection-on-a-budget paradigm which improves accuracy for a fixed proposal budget and conversely, requires very few proposals to meet an accuracy target.

A description will now be given regarding various aspects of the present invention that provide an improvement over the prior art and/or solve a deficiency of the prior art.

Regarding applications to which the present invention can be applied, it is to be appreciated that many computer vision applications that operate on videos heavily rely on object detectors. A prominent example is autonomous driving or advanced driver assistance systems, where reliably detecting objects is an essential part of the pipeline. Knowledge of the location and the category of objects is also a key component in other applications like understanding high-level activities in videos, generating natural descriptions of videos or tracking multiple objects consistently over time.

Conventional object detection methods in videos only rely on appearance, ignoring temporal information. However, all these methods fundamentally rely on object detection output from every frame of a video sequence, based on which higher-level reasoning is done to improve upon raw detections. In contrast, the present invention improves the underlying object detector itself by taking temporal information into account already at this stage. The proposed Sparse Video Proposals (SVP) can thus complement all of these methods with more efficient object detection.

Conventional object detectors operate offline, are computationally expensive and ignore predictions made in previous frames. In contrast, in an embodiment, the present invention can explicitly use high level information in the form of previous detections. The main task of object proposals is to aid an object detector, meaning that detections from the past are typically available for most applications anyway.

A description will now be given regarding Spare Video Proposals, in accordance with an embodiment of the present invention.

Many practical applications naturally operate on a stream of input data and require on-line processing. A relevant example is autonomous driving. For most video data, we can assume that not only do objects move, but also the camera is dynamic. However, every motion happens smoothly due to physical constraints, assuming a reasonable frame rate when capturing the scene.

Noting this observation, we can assume that detections in the previous frame $t-1$ can serve as a good prior for the detections in the current frame $t$. Moreover, if we track the detections, e.g., via a simple optical flow-based tracker (described below), we can assume an even better prior. Tracked detections from the previous frame offer a very good prior on object locations in the current frame and, interestingly, even outperform object proposals computed on the current frame at higher Intersection-over-Union (IoU) thresholds. Thus, for many cases, the tracked detections can be directly used as detection output in the current frame without the need to run the detector at all for those objects. This has the potential to save computation time and can even provide more stable and consistent prediction output. However, tracked detections can only act as a prior. The scene is dynamic and new objects appear while old ones get occluded or leave the visible area. Also, the prior may just be wrong, e.g., when the tracker fails. Consequently, recall will drop for tracked detections.

Herein, a new module is proposed that exploits well-localized tracked detections from the previous frame t−1 as well as proposals from the current frame t and produces a final set of sparse proposals only where needed. This module generates proposals only if: (i) a new object appears; (ii) the tracker fails to track the object resulting in poorly localized detection; (iii) the detector already failed in the previous frame. However, no proposals are generated if the tracker is successful.

A description will now be given regarding tracking object detections, in accordance with an embodiment of the present invention.

Sparse Video Proposals need an efficient way to track multiple detections, however, without the requirement of preserving identities over time (as in multi-object tracking). While any single-object tracker can be used with our framework, we only assume that it can track objects efficiently in order to not slow down the whole detection pipeline. Also, running the tracker in parallel to RPN and exploiting GPU acceleration make the tracker virtually come for free.

We rely on an optical flow based tracker because the bulk of the computation is then shared across all detections that need to be tracked. Given a video sequence up to frame t, we first compute long term interest point trajectories (IPTs) using optical flow (in this case it is just 2 frames) and the FAST feature detector. The feature points are being tracked until they disappear from the scene or optical flow fails (verified via forward-backward checks). In order to avoid having a redundant set of IPTs, we initiate a new IPT for a detected salient feature point, if and only if there are no existing IPTs within, e.g., 4 pixels (although other numbers of pixels can also be used).

To track a bounding box from one frame to another, we find the associated IPTs lying inside of the box and track it by estimating its scale change $(s_x, s_y)$ and translation $(t_x, t_y)$. The 4 parameters can be uniquely identified given more than 2 IPTs. In order to remove outlier IPTs, we adopt Random Sample Consensus (RANSAC) and for the rare cases when we have less than two IPTs, we set $(s_x, s_y)=(1.0, 1.0)$ and $(t_x, t_y)=(0, 0)$ or use the flow estimation $(f_x, f_y)$.

A description will now be given regarding generating Sparse Video Proposals (SVPs), in accordance with an embodiment of the present invention.

We are given a set of n tracked detections $\mathcal{T}^{t-1} = \{\mathcal{T}_1; \ldots; \mathcal{T}_n\}$ from the previous frame and a set of m proposals $P_t = \{P_1; \ldots; P_m\}$ from the current frame. The goal is to train a function $g(P_t, \mathcal{T}^{t-1})$ that produces proposals for frame t only where objects are not already covered by tracked detections. We denote this set $\hat{P}^t \subseteq P^t$ as Sparse Video Proposals (SVP).

While there exist many approaches to obtain the function $g(.,.)$, we formulate it as a binary classification problem, which can be realized very efficiently without generating noticeable overhead. For each proposal $P_i$, we compute a feature vector that integrates information from the tracked detections and decides whether or not it is already covered by a tracked detection.

A description will now be given regarding encoding tracked detections into proposals, in accordance with an embodiment of the present invention.

The desired behavior of the function $g(.,.)$ is to generate as few proposals as possible on which we need to apply the detector for classification and location refinement. Wherever there exists a tracked detection, we should not generate a new proposal. In cases where the tracker starts to drift or new objects appear, we expect the algorithm to generate new proposals. To learn this characteristic, we construct a 2-dimensional feature vector for each proposal $F(P_i)$ which consists of the proposal confidence $c_i^P$ and the maximum overlap with all tracked detections, i.e., $F(P_i)=[c_i^P; \max_j IoU(Pi, \mathcal{T}_1)]^T$.

A description will now be given regarding training, in accordance with an embodiment of the present invention.

We define the labels of each proposal $P_i$ for our classification problem as follows:

$$L(P_i) = \begin{cases} 1, & \text{if } IoU(P_i, GT) > 0.5 \\ 0, & IoU(P_i, GT) < 0.3 \text{ or } IoU(Pi, \mathcal{T}_j) > 0.7 \end{cases}$$

where $IoU(.,.)$ is the intersection over union overlap, GT is a ground truth bounding box and $\mathcal{T}_1$ a tracked detection from the previous frame. Importantly, the second constraint in the equation takes precedence over the first one. When none of the conditions are met, we ignore that sample, like in a Regional Proposed Network (RPN). Whenever the tracker will drift, the network will learn to produce a new object proposal. Further, it will also generate a proposal when a new object appears.

In practice, we instantiate the function $g(.,.)$ with a simple 3-layer neural network with 100 units in each hidden layer and ReLU as a non-linearity function. We use the soft-max cross-entropy loss and stochastic gradient descent with learning rate of 0.001 for training the network parameters. We need to train the network only for 3000 iterations, which we found to be enough in all our experiments, because the features are low dimensional. Also, since the number of proposals are much more than number of tracked detections, we use a sampling scheme similar to RPN. In each mini-batch, 256 proposals are sampled from each image, which can include a maximum of 128 positive proposals. We mainly chose neural networks because of easier integration into the existing object detector framework, which is based on neural networks.

A description will now be given regarding regularization, in accordance with an embodiment of the present invention.

During training, we apply the detector on image-based region proposals and track the detections for one frame. Since we only track for one frame, most detections are more accurate than image-based proposals. Moreover, tracking failures and newly appearing objects are rare, which leads to a highly skewed label set for our classification problem where the classifier only rarely sees cases where a positive response is required. Instead of applying the tracker for a variable number of frames for each object separately, we propose a much simpler regularization scheme. We simulate the appearance of new objects and complete tracking failures by randomly dropping tracked detections with probability p. To also simulate drifting of the tracker, we replace the maximum overlap with a tracked detection with an arbitrary overlap in the range from 0 to 0.25 when computing features for the proposals. This form of regularization encourages the classifier to predict a proposal with high score if there is sufficient evidence in the image but the tracker fails or it is a newly appearing object.

A description will now be given regarding a detection pipeline, in accordance with an embodiment of the present invention.

When object detectors are applied in real time, there always exists a computational budget. With this fixed budget, the algorithm should obtain best possible accuracy. Most state-of-the-art detectors scale linearly with the number of proposals that are evaluated. This number is typically fixed and independent from the image content, which thus provides a knob to easily adjust the runtime of the detector to a large extent. However, since the detections in previous frames are typically ignored, objects have to be "re-detected" in every frame, which requires the number of proposals to be at least equal to the number of objects in the scene. In practice, this number typically needs to be even larger for two reasons: first, the number of objects in a scene is typically unknown, which requires to estimate the maximum number of objects that can appear in any frame, in order to avoid missing objects; and second, multiple high-scoring proposals often cover only a single object.

The Sparse Video Proposals (SVPs) in accordance with the present invention enable object detectors to operate with a very low number of proposals that are only responsible for new objects and tracking failures. The remaining objects in the current frame are covered by detections tracked from the previous frame. Since our SVP detects tracking failures and correctly generates new proposals that are better aligned with the object, we also need a mechanism to remove tracked detections that are not covering an object anymore. We differentiate two scenarios as follows. First, if a new proposal is generated near a tracked detection (IoU>0.5 between the tracked bounding box and the proposal bounding box), it implies that the tracker has drifted and hence a new proposals was generated. We simply remove those tracked detections in order to avoid false positives. Second, if the tracker drifts significantly due to fast camera or object movements, frame drops, etc., the above described rejection mechanism can fail. To eliminate such spurious bounding boxes, we downgrade the K oldest tracked detections to object proposals on which the detector needs to be applied again. We define age as the number of frames a detection has already tracked. The detector then acts as a verification for these old tracked detections. If the tracked detection still captures an object in the image properly, we reset its age. Otherwise, the tracked detection is dropped.

This mechanism knows two extremes as follows. Assume we have a budget of B=N+K proposals on which we can run the detector, where N proposals are reserved for new proposals generated by SVP. Then, setting K equal to N−1 implies that we do not rely on the tracker at all and use it only to provide better proposals for the next frame. In the other extreme, setting K to 0 means that we completely rely on the tracker. SVP then only identifies new objects which are tracked until they leave the scene. In practice, we set K to around 30% of the total budget B.

A description will now be given regarding SVP, in accordance with an embodiment of the present invention.

SVP works by exploiting temporal information and effectively combining tracking and detection. Since it is agnostic of the detector and proposal generation algorithm, it is simple to apply on top of existing detection frameworks. The major benefit of SVP is that it can operate on a low number of proposals without sacrificing much accuracy. SVP can be used for extreme cases where SVP runs with as low as 3 proposals per frame while still achieving reasonable accuracy. We expect SVP to perform well in scenarios where many objects are visible, e.g., typical driving scenarios capturing many cars and pedestrians.

In practice, a lower number of proposals typically translates to faster processing. While a thorough timing comparison is hard since it changes significantly between different object detectors, image sizes and many other factors, we choose one standard setup in our experiments (Faster-RCNN) to compute timings. Regardless, any benefit from fewer proposals that is obtainable for current or future methods is available for SVP. One of the factors for achieving practical speed-up is also the overhead introduced by SVP and keeping it low is one of our design goals. We employ an efficient classifier inside SVP, which virtually adds no computation time compared to extracting features for RPN and the detector. Also, we use a light-weight tracking algorithm that operates on optical flow, which can be run in real-time on a Graphics Processing Unit (GPU) or computed in parallel to feature extraction for RPN and the detector.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for driving assistance, comprising:
an image capture device configured to capture a video sequence relative to an outward view from a motor vehicle and formed from a set of input image frames, the video sequence including a set of objects;
a processor configured to
detect the objects to form a set of object detections;
track the set of object detections over one or more of the input frames to form tracked detections over the one or more input frames;
generate for a current input frame, responsive to a set of conditions, a set of sparse object proposals for a current location of one or more of the objects in the set based on: (i) the tracked detections of the one or more of the objects from an immediately previous one of the input frames; and (ii) detection proposals for the one or more objects derived from the current frame; and
perform an action to mitigate a likelihood of potential harmful due to a current location of the one or more of the objects relative to the motor vehicle, based on the set of sparse object proposals,
wherein the set of sparse object proposals is determined using a function g that produces the sparse object proposals for the current frame only when a given condition in the set of conditions is unsatisfied, the given condition being that the tracked detections lack inclusion of the one or more of the objects, and
wherein the tracked detections include a set of n tracked detections $T^{t-1} = \{T_1; \ldots; T_n\}$ from the immediately previous one of the input frames, and the detection proposals from the current frame include a set of m sparse object proposals $P_t = \{P_1; \ldots; P_m\}$ from the current frame, such that the function is implemented by $g(P_t, T^{t-1})$.

2. The system of claim 1, wherein the function is formulated as a binary classification problem.

3. The system of claim 1, wherein the function is implemented by a neural network.

4. The system of claim 1, wherein the set of conditions is selected to include one or more of the following selected from the group consisting of (a) a new object appearing in at least one the input frames; (b) an object detection tracking operation failing to track the one or more of the objects in the at least one the input frames; (c) an objection detection operation having failing to track the one or more of the objects in the at least one the input frames.

5. The system of claim 1, wherein the processor is further configured to bypass a generation of the set of sparse object proposals responsive to an object detection tracking operation being successful for the one or more of the objects over the input frames.

6. The system of claim 1, wherein the action comprises providing, by the processor, a user perceptible indication of the current location of the one or more of the objects to a user of the motor vehicle, based on the set of sparse object proposals.

7. The system of claim 1, wherein the processor provides the user perceptible indication of the current location of the one or more of the objects in the set using a media providing device selected from the group consisting of a display device and a speaker.

8. The system of claim 1, wherein the processor is further configured, for each of the sparse object proposals, to construct a 2-dimensional feature vector that includes a proposal confidence and a maximum allowable overlap with all of the tracked detections.

9. The system of claim 8, wherein the processor is further configured to determine, for each of the sparse object proposals, whether the 2-dimensional feature vector therefor has already been constructed for any of the tracked detections.

10. The system of claim 1, wherein the processor is further configured to generate a list of any of the objects that have been detected and locations of the any of the objects and provide the list to a user using a media providing device.

11. The system of claim 1, wherein the processor is further configured to compute long term Interest Point Trajectories for each of the input frames, based on an output of an optical flow-based tracker implemented by the processor and on an output of a feature detector implemented by the processor.

12. The system of claim 11, wherein the processor is further configured to compute a long term Interest Point Trajectory for a given one of the input frames only when there is a lack of existing long term Interest Point Trajectories within a predetermined number of pixels in the given one of the input frames.

13. The system of claim 11, wherein the processor is configured to track the set of object detections over two or more of the input frames by tracking a bounding box over the two or more frames, wherein the bounding box is tracked by finding any of the long term Interest Point Trajectories within the bounding box and tracking each of the long term Interest Point Trajectories by estimating a scale change and a translation therefor.

14. The system of claim 1, wherein the system is comprised in an advanced driver-assistance system that uses a decision making process to evaluate a scene depicted in at least one of the input frames as potentially dangerous such that the processor provides the user-perceptible indication to indicate that the scene is potentially dangerous.

15. The system of claim 1, wherein the system is comprised in an advanced driver-assistance system that uses a decision making process to evaluate a scene as potentially dangerous such that the processor automatically takes control over one or more systems of the motor vehicle to mitigate any potential harm.

16. The system of claim 15, wherein the one or more systems of the motor vehicle are selected from the group of systems consisting of a steering system, a braking system, and an acceleration system.

17. The system of claim 1, wherein the system is comprised in an advanced driver-assistance system that uses a decision making process to select a particular set of actions to the user of the motor vehicle, and that uses a hardware device to make the user aware of the particular set of actions in order to avoid a potentially dangerous condition.

18. A computer-implemented method for driving assistance, comprising:
capturing, by an image capture device, a video sequence relative to an outward view from a motor vehicle and formed from a set of input image frames, the video sequence including a set of objects;
detecting, by a processor, the objects to form a set of object detections;
tracking, by the processor, the set of object detections over one or more of the input frames to form tracked detections over the one or more input frames;

generating, by the processor, for a current input frame, responsive to a set of conditions, a set of sparse object proposals for a current location of one or more of the objects in the set based on: (i) the tracked detections of the one or more of the objects from an immediately previous one of the input frames; and (ii) detection proposals for the one or more objects derived from the current frame; and performing, by the processor, an action to mitigate a likelihood of potential harmful due to a current location of the one or more of the objects relative to the motor vehicle, based on the set of sparse object proposals, wherein the set of sparse object proposals is determined using a function g that produces the sparse object proposals for the current frame only when a given condition in the set of conditions is unsatisfied, the given condition being that the tracked detections lack inclusion of the one or more of the objects, and wherein the tracked detections include a set of n tracked detections $\mathcal{T}^{t-1} = \{\mathcal{T}_1; \ldots; \mathcal{T}_n\}$ from the immediately previous one of the input frames, and the detection proposals from the current frame include a set of m sparse object proposals $P_t = \{P_1; \ldots; P_m\}$ from the current frame, such that the function is implemented by $g(P_t, \mathcal{T}^{t-1})$.

19. A computer program product for driving assistance, the computer program product comprising a non-transitory computer readable storage medium having program instructions embodied therewith, the program instructions executable by a computer to cause the computer to perform a method comprising:

capturing, by an image capture device, a video sequence relative to an outward view from a motor vehicle and formed from a set of input image frames, the video sequence including a set of objects;

detecting, by a processor, the objects to form a set of object detections;

tracking, by the processor, the set of object detections over one or more of the input frames to form tracked detections over the one or more input frames;

generating, by the processor, for a current input frame, responsive to a set of conditions, a set of sparse object proposals for a current location of one or more of the objects in the set based on: (i) the tracked detections of the one or more of the objects from an immediately previous one of the input frames; and (ii) detection proposals for the one or more objects derived from the current frame; and performing, by the processor, an action to mitigate a likelihood of potential harmful due to a current location of the one or more of the objects relative to the motor vehicle, based on the set of sparse object proposals, wherein the set of sparse object proposals is determined using a function g that produces the sparse object proposals for the current frame only when a given condition in the set of conditions is unsatisfied, the given condition being that the tracked detections lack inclusion of the one or more of the objects, and wherein the tracked detections include a set of n tracked detections $\mathcal{T}^{t-1} = \{\mathcal{T}_1; \ldots; \mathcal{T}_n\}$ from the immediately previous one of the input frames, and the detection proposals from the current frame include a set of m sparse object proposals $P_t = \{P_1; \ldots; P_m\}$ from the current frame, such that the function is implemented by $g(P_t, \mathcal{T}^{t-1})$.

* * * * *